US008640941B2

(12) United States Patent
Cheney

(10) Patent No.: US 8,640,941 B2
(45) Date of Patent: Feb. 4, 2014

(54) FINE GRAINED NI-BASED ALLOYS FOR RESISTANCE TO STRESS CORROSION CRACKING AND METHODS FOR THEIR DESIGN

(75) Inventor: Justin Lee Cheney, San Francisco, CA (US)

(73) Assignee: Scoperta, Inc., San Diego, CA (US)

( * ) Notice: Subject to any disclaimer, the term of this patent is extended or adjusted under 35 U.S.C. 154(b) by 0 days.

(21) Appl. No.: 13/428,296

(22) Filed: Mar. 23, 2012

(65) Prior Publication Data

US 2012/0267420 A1 Oct. 25, 2012

Related U.S. Application Data

(60) Provisional application No. 61/466,875, filed on Mar. 23, 2011.

(51) Int. Cl.
*C22C 19/05* (2006.01)
*B23K 31/02* (2006.01)

(52) U.S. Cl.
USPC ............................ 228/101; 420/442; 420/452

(58) Field of Classification Search
None
See application file for complete search history.

(56) References Cited

U.S. PATENT DOCUMENTS

| | | | | |
|---|---|---|---|---|
| 2,043,952 A * | 6/1936 | Ffield | ........................... | 228/256 |
| 2,156,306 A * | 5/1939 | Rapatz | ........................... | 428/638 |
| 2,936,229 A * | 5/1960 | Shepard | ........................... | 75/254 |
| 3,024,137 A * | 3/1962 | Witherell | ................... | 219/146.23 |
| 3,181,970 A * | 5/1965 | Witherell et al. | ........ | 219/146.22 |
| 3,554,792 A * | 1/1971 | Johnson | ................... | 219/146.52 |
| 3,650,734 A * | 3/1972 | Kantor et al. | ................. | 420/445 |
| 3,843,359 A * | 10/1974 | Flene et al. | ..................... | 420/453 |
| 3,859,060 A * | 1/1975 | Eiselstein et al. | ............. | 420/448 |
| 3,975,612 A * | 8/1976 | Nakazaki et al. | ........ | 219/121.14 |
| 4,010,309 A | 3/1977 | Peterson | | |
| 4,017,339 A * | 4/1977 | Okuda et al. | ..................... | 148/24 |
| 4,042,383 A * | 8/1977 | Petersen et al. | ............... | 420/453 |
| 4,415,530 A * | 11/1983 | Hunt | ............................. | 420/453 |
| 4,639,576 A | 1/1987 | Shoemaker et al. | | |
| 4,762,681 A * | 8/1988 | Tassen et al. | ................. | 420/443 |

(Continued)

FOREIGN PATENT DOCUMENTS

JP  60-133996 A  *  7/1985
JP  03-133593 A  *  6/1991

OTHER PUBLICATIONS

International Search Report for International App. No. PCT/US2012/030365, date of mailing Jul. 10, 2012.

(Continued)

*Primary Examiner* — Kiley Stoner
(74) *Attorney, Agent, or Firm* — Knobbe Martens Olson & Bear, LLP

(57) ABSTRACT

A class of nickel based alloys having a fine grain structure resistant to stress corrosion cracking, and methods of alloy design to produce further alloys within the class are presented. The alloys act as suitable welding materials in similar applications to that of Alloy 622. The fine-grained structure of these novel alloys may also be advantageous for other reasons as well such as wear, impact, abrasion, corrosion, etc. These alloys have similar phases to Alloy 622 in that they are composed primarily of austenitic nickel, however the phase morphology is a much finer grained structure opposed to the long dendritic grains common to Alloy 622 when it is subject to cooling rates from a liquid state inherent to the welding process.

12 Claims, 12 Drawing Sheets

(56) References Cited

U.S. PATENT DOCUMENTS

| | | | |
|---|---|---|---|
| 4,981,644 A * | 1/1991 | Chang | 420/442 |
| 5,306,358 A * | 4/1994 | Lai et al. | 148/427 |
| 5,375,759 A * | 12/1994 | Hiraishi et al. | 228/175 |
| 5,618,451 A * | 4/1997 | Ni | 219/121.53 |
| 5,935,350 A * | 8/1999 | Raghu et al. | 148/427 |
| 6,210,635 B1 * | 4/2001 | Jackson et al. | 420/445 |
| 6,441,334 B1 * | 8/2002 | Aida et al. | 219/74 |
| 7,491,910 B2 * | 2/2009 | Kapoor et al. | 219/146.23 |
| 2003/0005981 A1 * | 1/2003 | Ogawa et al. | 148/428 |
| 2003/0062356 A1 * | 4/2003 | Jiang | 219/145.31 |
| 2004/0062677 A1 * | 4/2004 | Chabenat et al. | 420/448 |
| 2004/0115086 A1 * | 6/2004 | Chabenat et al. | 420/452 |
| 2006/0191606 A1 * | 8/2006 | Ogawa et al. | 148/327 |
| 2007/0090167 A1 * | 4/2007 | Arjakine et al. | 228/101 |
| 2007/0267390 A1 * | 11/2007 | Jiang et al. | 219/121.45 |
| 2007/0284018 A1 * | 12/2007 | Hamano et al. | 148/428 |
| 2008/0093352 A1 * | 4/2008 | Jang et al. | 219/145.22 |
| 2009/0017328 A1 * | 1/2009 | Katoh et al. | 428/653 |
| 2009/0285715 A1 * | 11/2009 | Arjakine et al. | 420/450 |
| 2010/0044348 A1 * | 2/2010 | Buchmann | 219/117.1 |
| 2010/0136368 A1 * | 6/2010 | Kiser et al. | 428/680 |
| 2010/0166594 A1 * | 7/2010 | Hirata et al. | 420/443 |
| 2010/0189588 A1 * | 7/2010 | Kawatsu et al. | 420/12 |
| 2012/0156020 A1 * | 6/2012 | Kottilingam et al. | 415/200 |
| 2012/0160363 A1 * | 6/2012 | Jin et al. | 138/177 |
| 2012/0288400 A1 * | 11/2012 | Hirata et al. | 420/448 |

OTHER PUBLICATIONS

Olsen et al: "Passages", AMS Handbook, Welding, Brazing and Soldering, vol. 6, Dec. 1, 1993 pp. 586-592, XP008097120, p. 589.

* cited by examiner

FINE GRAINED NI-BASED ALLOYS FOR RESISTANCE TO STRESS CORROSION CRACKING AND METHODS FOR THEIR DESIGN

CROSS REFERENCE TO RELATED APPLICATIONS

This application claims the benefit of U.S. Provisional Application No. 61/466,875, filed on Mar. 23, 2011, which is hereby incorporated in its entirety.

TECHNICAL FIELD

The present invention relates generally to corrosion resistant alloys typically used in cladding operations to protect steel surfaces in power generation, chemical processing, oil and gas, and other industries.

DESCRIPTION OF THE RELATED ART

In corrosion prone environments, nickel-based alloys are frequently employed as weld overlays. Austenitic nickel is the desired phase for corrosion performance and thermal expansion compatibility with mild steel. While the current offering of Alloy 622 or similar high Cr and Mo Ni-based alloys offer good corrosion protection, they commonly fail in applications subject to thermal fluctuations, such as boiler tubes. Such thermal fluctuations induce stress corrosion cracking in Alloy 622 or similar alloys along the grain boundaries, which commonly extend from the surface of a weld bead down to the weld/substrate interface. Along this path there is no resistance to crack propagation, and it is a common failure mechanism in applications under thermal cycling.

Dilution of the weld bead with the underlying steel is also a factor which must be minimized if the corrosive performance of the weld overlay is to be maintained. The presence of iron in the weld metal reduces corrosion performance with increasing concentration. In practice, weld parameters are closely controlled and the weld is deposited in the vertical position so that dilution is minimized below a certain level, such as 10-15% whereas typical weld overlay conditions will create 30% dilution. A competing interest towards minimizing dilution is increasing productivity. Increased amperage and wire feed rates allow the material to be deposited faster and thus enable the cladding to be performed in a minimal time.

BRIEF SUMMARY OF THE EMBODIMENTS OF THE INVENTION

The present invention is directed toward a class of alloys having a fine grain structure resistant to stress corrosion cracking, and methods of alloy design to produce further alloys within the class. The purpose of these alloys are to act as suitable welding materials in similar applications to that of Alloy 622. The fine-grained structure of these novel alloys may also be advantageous for other reasons as well such as wear, impact, abrasion, corrosion, etc. These alloys have similar phases to Alloy 622 in that they are composed primarily of austenitic nickel, however the phase morphology is a much finer grained structure opposed to the long dendritic grains common to Alloy 622 when it is subject to cooling rates from a liquid state inherent to the welding process. In one embodiment, the fine grained structure of the alloy class presented here offer improved stress corrosion cracking resistance because there is no path of easy crack propagation as there is in typical Alloy 622 or similar alloys. In another embodiment, the alloys are manufactured into a form of cored wire which allows for improved productivity and minimal dilution. These alloys may be employed in corrosion protection of boiler tubes in power generation plants or a wide variety of other potential applications.

In one embodiment, a composition of matter is presented, comprising a balance of nickel; between approximately 20.5 and 30 wt. % chromium; between approximately 5.5 and 18.5 wt. % molybdenum; between 0 and approximately 1.75 wt. % boron; between 0 and approximately 3.5 wt. % silicon; between 0 and approximately 5 wt. % titanium; between 0 and approximately 17 wt. % niobium; and between 0 and approximately 15 wt. % tin. In a further embodiment, the composition comprises a balance of nickel; between approximately 25 and 30 wt. % chromium; between approximately 5.5 and 15.5 wt. % molybdenum; between approximately 0.3 and 1.6 wt. % boron; and between 0 and approximately 3.5 wt. % silicon; but does not include titanium, niobium, or tin except as impurities. In a still further embodiment, the composition comprises a balance of nickel; between approximately 26 and 29 wt. % chromium; between approximately 10 and 15.5 wt. % molybdenum; between approximately 0.4 and 1.2 wt. % boron; and between approximately 1 and 3 wt. % silicon.

In a further embodiment, the composition of matter is in the form of a cored welding wire. The composition is present in the aggregate combination of the sheath and the core powder materials. The weld bead formed using the welding wire is an alloy having the composition, along with some inevitable dilution caused by the substrate. In particular, the sheath may be an alloy also having a composition in the above ranges, but with a melting temperature less than the final weld bead. During welding, the sheath is melted and carries the powder components to the substrate to form a weld pool. The powder components diffuse with the melted sheath to form a liquid weld pool. Because the weld pool has a higher melting temperature than the sheath, the weld pool cools rapidly, limiting dilution by the substrate and forming a fine-grained structure.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a class of alloys having a fine grain structure resistant to stress corrosion cracking, and methods of alloy design to produce further alloys within the class. The purpose of these alloys are to act as suitable welding materials in similar applications to that of Alloy 622. The fine-grained structure of these novel alloys may also be advantageous for other reasons as well such as wear, impact, abrasion, corrosion, etc. These alloys have similar phases to Alloy 622 in that they are composed primarily of austenitic nickel, however the phase morphology is a much finer grained structure opposed to the long dendritic grains common to Alloy 622 when it is subject to cooling rates from a liquid state inherent to the welding process. In one embodiment, the fine grained structure of the alloy class presented here offer improved stress corrosion cracking resistance because there is no path of easy crack propagation as there is in typical Alloy 622 or similar alloys. In another embodiment, the alloys are manufactured into a form of cored wire which allows for improved productivity and minimal dilution. These alloys may be employed in corrosion protection of boiler tubes in power generation plants or a wide variety of other potential applications. As used herein the term "fine grain structure" refers to alloys having grain lengths that are less than 150 μm.

Figure 1:
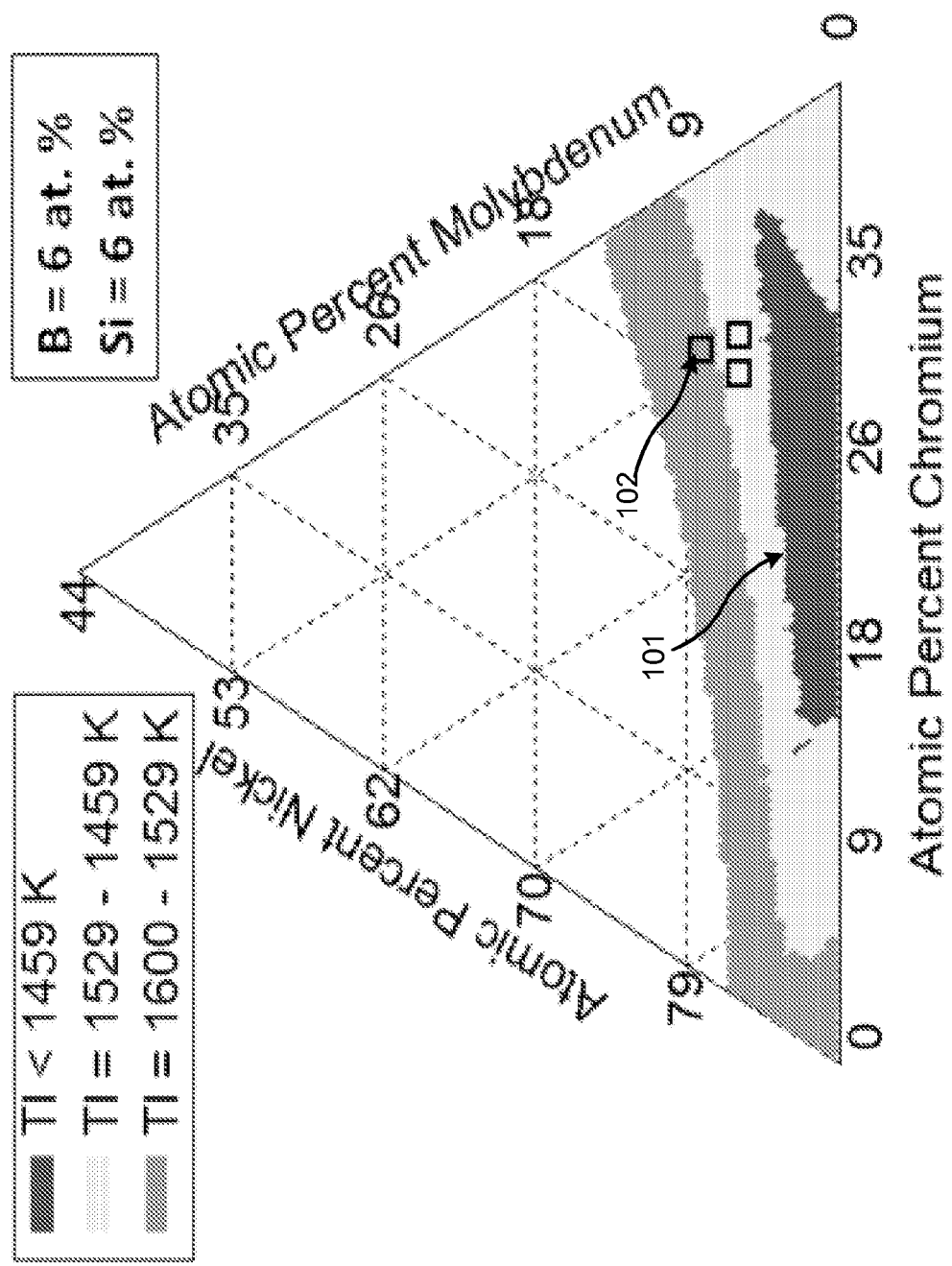
FIG. 1 illustrates a modeling diagram developed using compositional ranges of chromium, nickel, and molybdenum.

In one embodiment, a method of designing fine grained weld materials comprises using theoretical liquidus temperature calculations to design for alloy chemistries located on or near deep eutectics, thus insuring a fine grained alloy microstructure under cooling rates common to the welding process, 5000 K/s or less. Predicted liquidus temperatures of various experimental compositional ranges may be developed using computer modeling. FIG. 1 illustrates a modeling diagram developed using compositional ranges of chromium, nickel, and molybdenum. Compositions having the lowest predicted melting temperature will typically have finer grain size. In the illustrated modeling diagram, the compositions 101 shown in red have the lowest melting temperatures. In the described embodiment, the method further comprises establishing constraints where certain elements are restricted to minimum values and given this constraint, the alloy with the lowest melting temperature is selected. In the illustrated compositions, desired corrosion performance requires at least 6 at. % molybdenum. Accordingly, in the illustrated embodiment, alloys having low melting temperatures under these constraint 102, are investigated further. Such further investigations, in some embodiments, may comprise production of alloy ingots for property testing and welding wires for application testing. In the illustrated embodiment, a minimum amount of Cr may also be employed as a constraint, for example 20 wt. %.

Figure 2A:
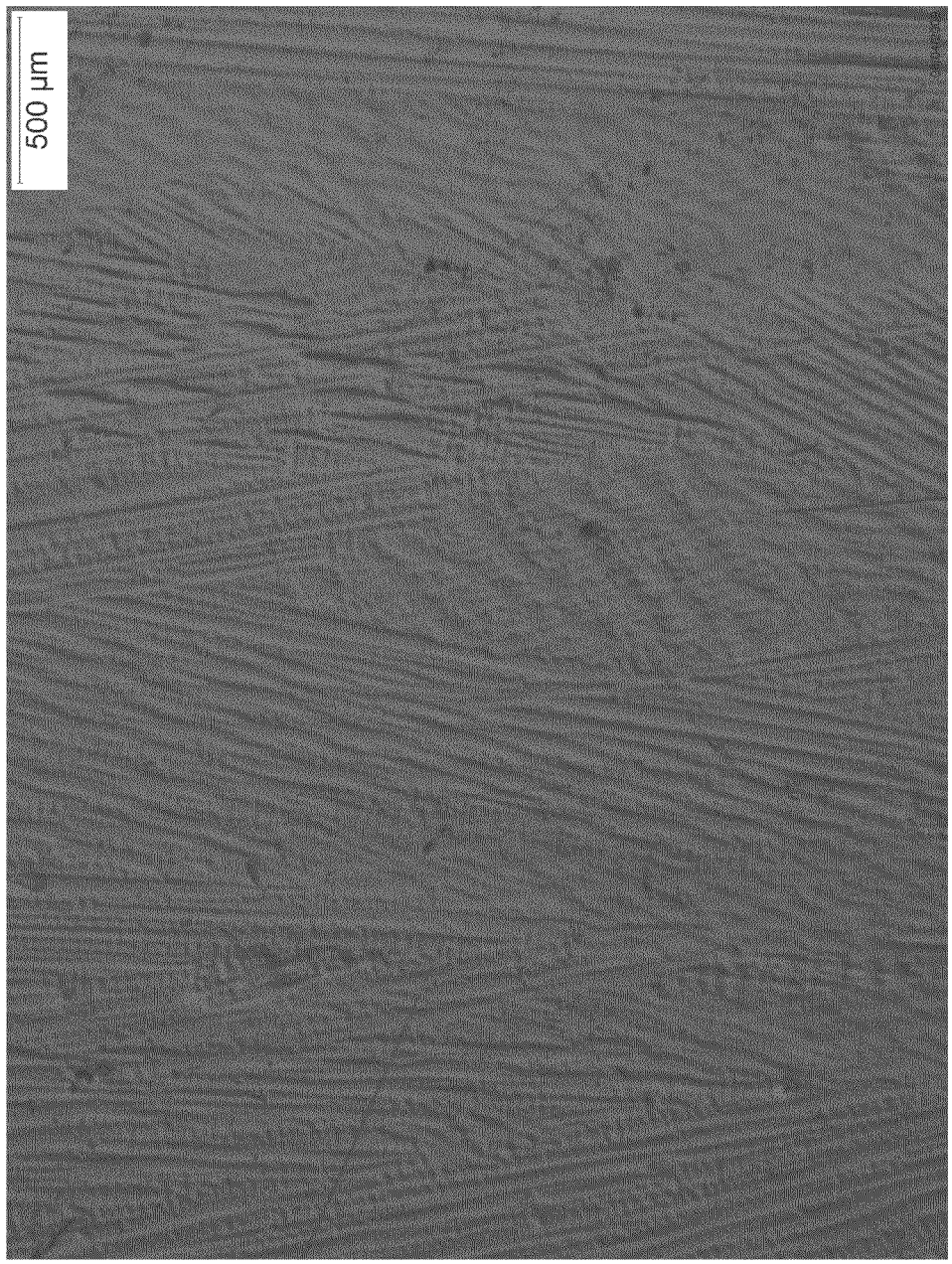
FIG. 2A illustrates a coarse grained dendritic microstructure typical of Alloy 622 type weld overlays used in boiler tube corrosion protection.
Figure 2B:
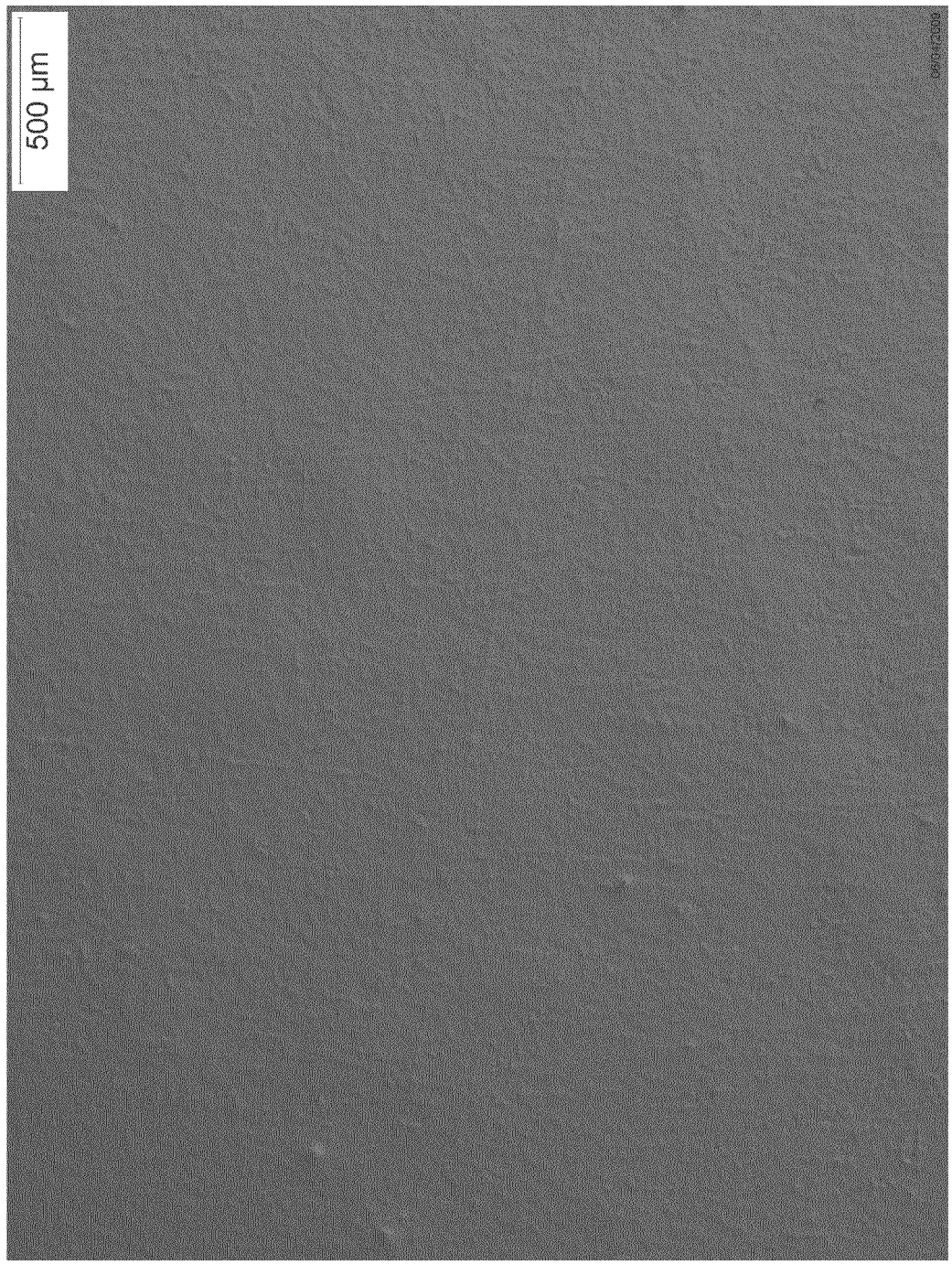
FIG. 2B is an optical micrograph, at the same scale as FIG. 2A, illustrating the fine grained microstructure of typical embodiments of the invention, specifically NiBalCr27.35Mo10.71Fe0.23Si2.71B1.17 (in wt. %) produced in ingot form.

FIG. 2 illustrates a comparison between grain structures in commercial alloys and embodiments of the invention. FIG. 2A illustrates a coarse grained dendritic microstructure typical of Alloy 622 type weld overlays used in boiler tube corrosion protection. This example is 27% Cr, 11% Mo, balance Ni (in weight percent) produced in ingot form. As can be seen, single grains are greater than several millimeters in length. FIG. 2B is an optical micrograph, at the same scale as FIG. 2A, illustrating the fine grained microstructure of typical embodiments of the invention, specifically $Ni_{Bal}Cr_{27.35}Mo_{10.71}Fe_{0.23}Si_{2.71}B_{1.17}$ (in wt. %) produced in ingot form.

Figure 3A:
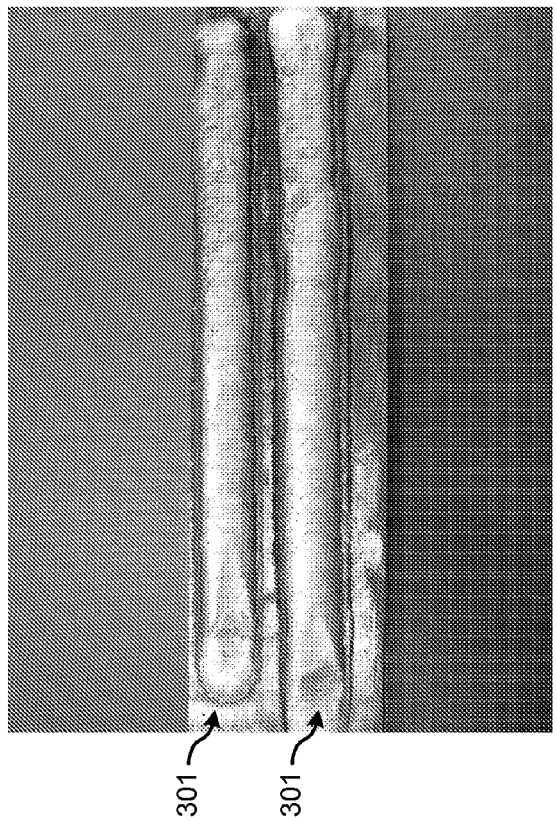
FIG. 3A illustrates a weld trial using the stringer bead technique.
Figure 3B:
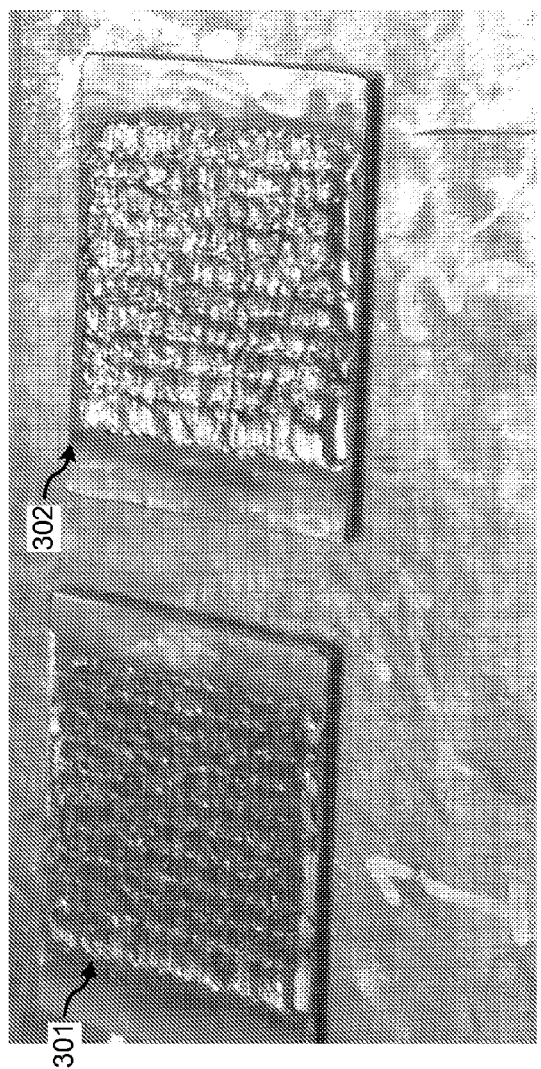
FIG. 3B illustrates a weld trial using the oscillation technique.

FIG. 3 illustrates weld trials using alloys $Ni_{Bal}Cr_{27.35}Mo_{10.71}Fe_{0.23}Si_{2.71}B_{1.17}$ (301) and $Ni_{Bal}Cr_{28.86}Mo_{15.17}Fe_{0.14}Si_{1.13}B_{0.47}$ (302). FIG. 3A illustrates a weld trial using the stringer bead technique on alloy #301 and FIG. 3B illustrates a weld trial using the oscillation technique on alloys #301 and #302.

Figure 4A:
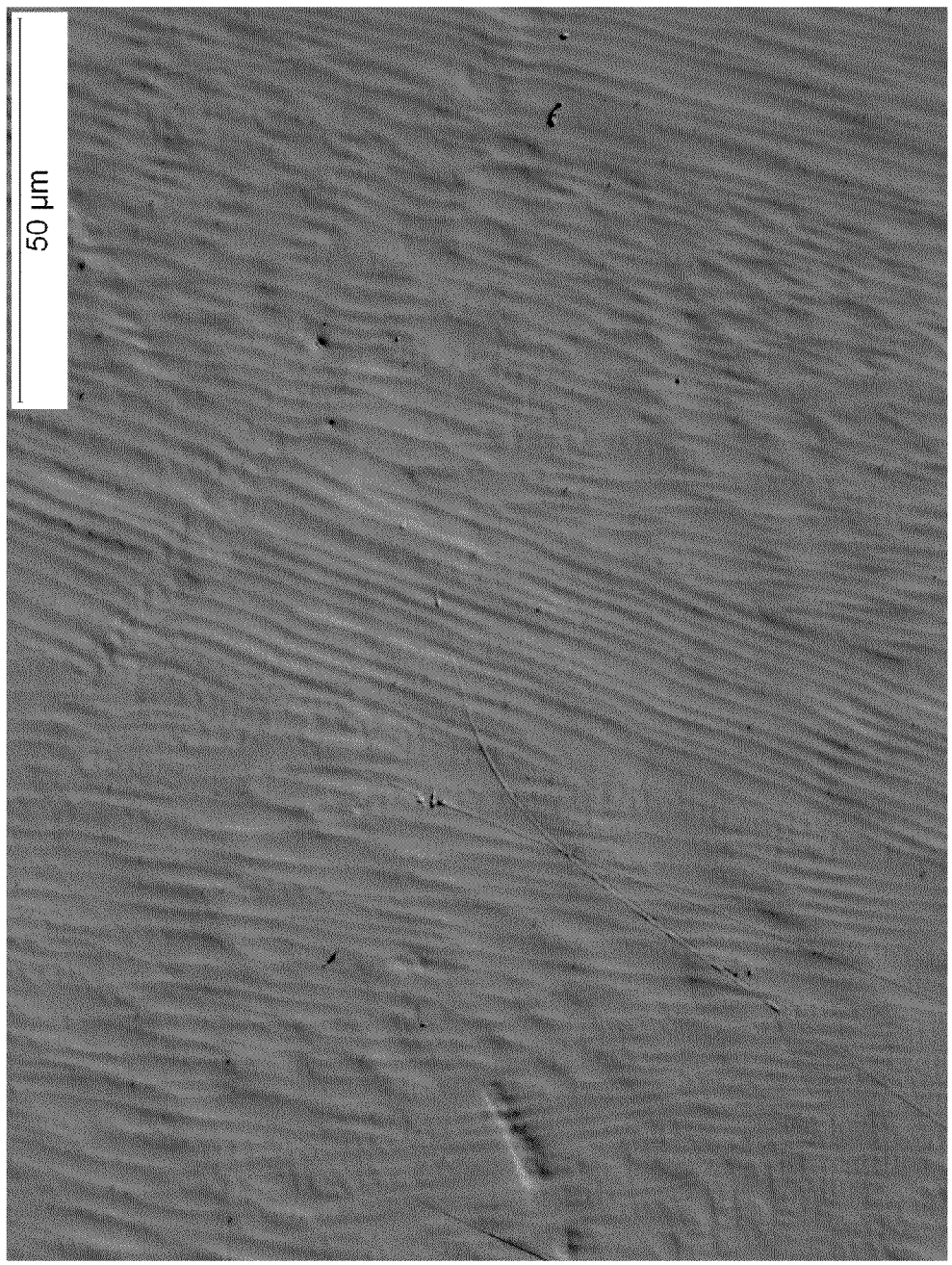
FIG. 4A is a commercially available Alloy 622.
Figure 4B:
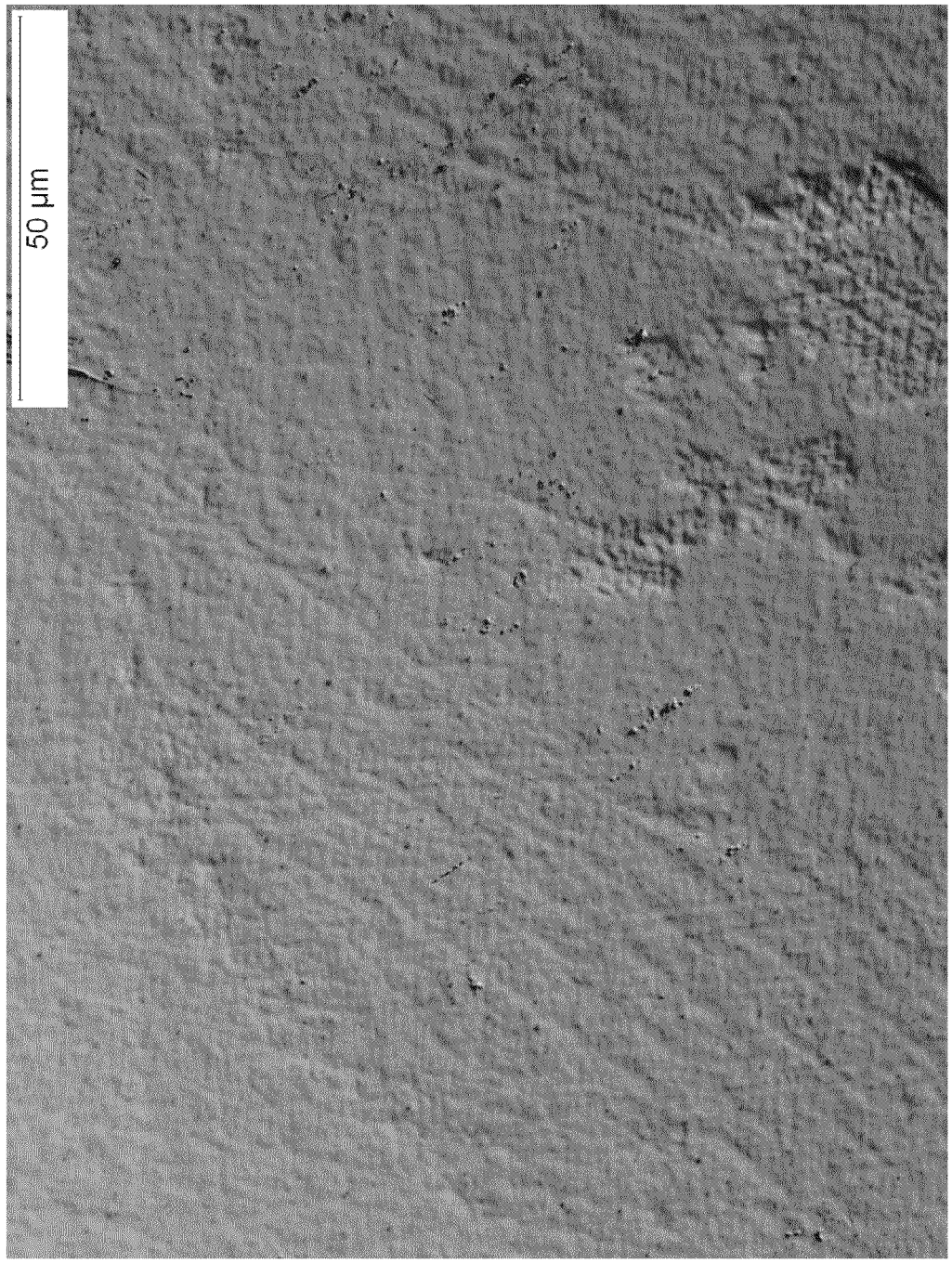
FIG. 4B illustrates an embodiment of the present invention, alloy $Ni_{Bal}Cr_{27.35}Mo_{10.71}Fe_{0.23}Si_{2.71}B_{1.17}$.

FIG. 4 illustrates optical micrographs (500×) comparing commercially available alloys and an embodiment of the current invention. FIG. 4A is a commercially available Alloy 622. FIG. 4B illustrates an embodiment of the present invention, alloy $Ni_{Bal}Cr_{27.35}Mo_{10.71}Fe_{0.23}Si_{2.71}B_{1.17}$. Alloy 622 possess grain much larger than 100 μm extending across the entire field of view (>150 μm in total height). Alloy $Ni_{Bal}Cr_{27.35}Mo_{10.71}Fe_{0.23}Si_{2.7}1B_{1.17}$ possesses a fine grain structure with lengths 100 μm or less. Both alloys were processed using the conventional gas metal arc welding (GMAW) technique, a process which completely melts the alloy and allows a cooling rate slower than 5000 K/s.

Figure 5:
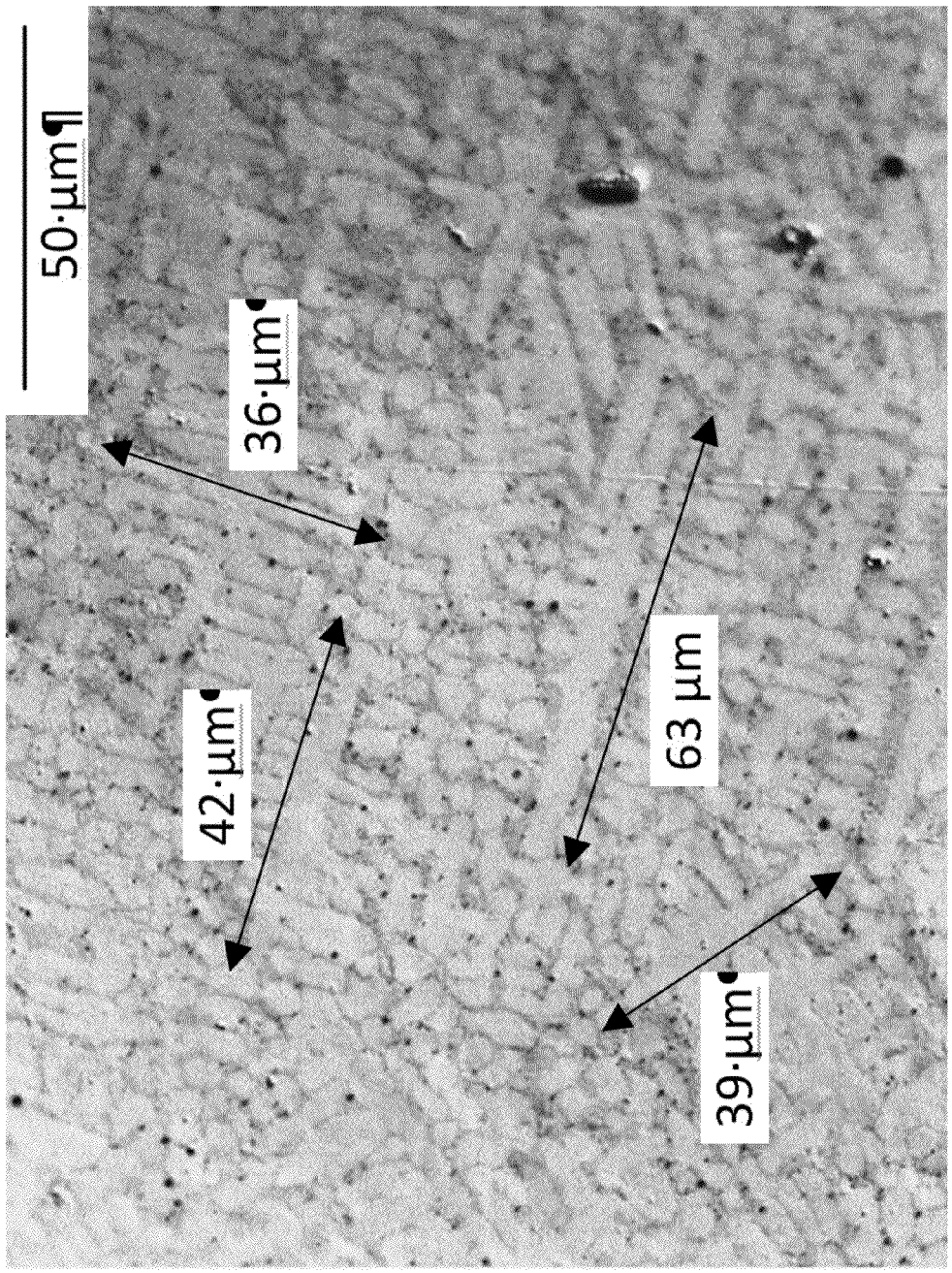
FIG. 5 is an optical micrograph (500×) of an embodiment of the invention, alloy $Ni_{Bal}Cr_{28.86}Mo_{15.17}Fe_{0.14}Si_{1.13}B_{0.47}$, welded on to flat steel plate showing image analysis used to determine grain size.

FIG. 5 is an optical micrograph (500×) of an embodiment of the invention, alloy $Ni_{Bal}Cr_{28.86}Mo_{15.17}Fe0.14Si_{1.13}B_{0.47}$, welded on to flat steel plate showing image analysis used to determine grain size. Grain sizes between 36 μm and 63 μm are highlighted.

Figure 6:
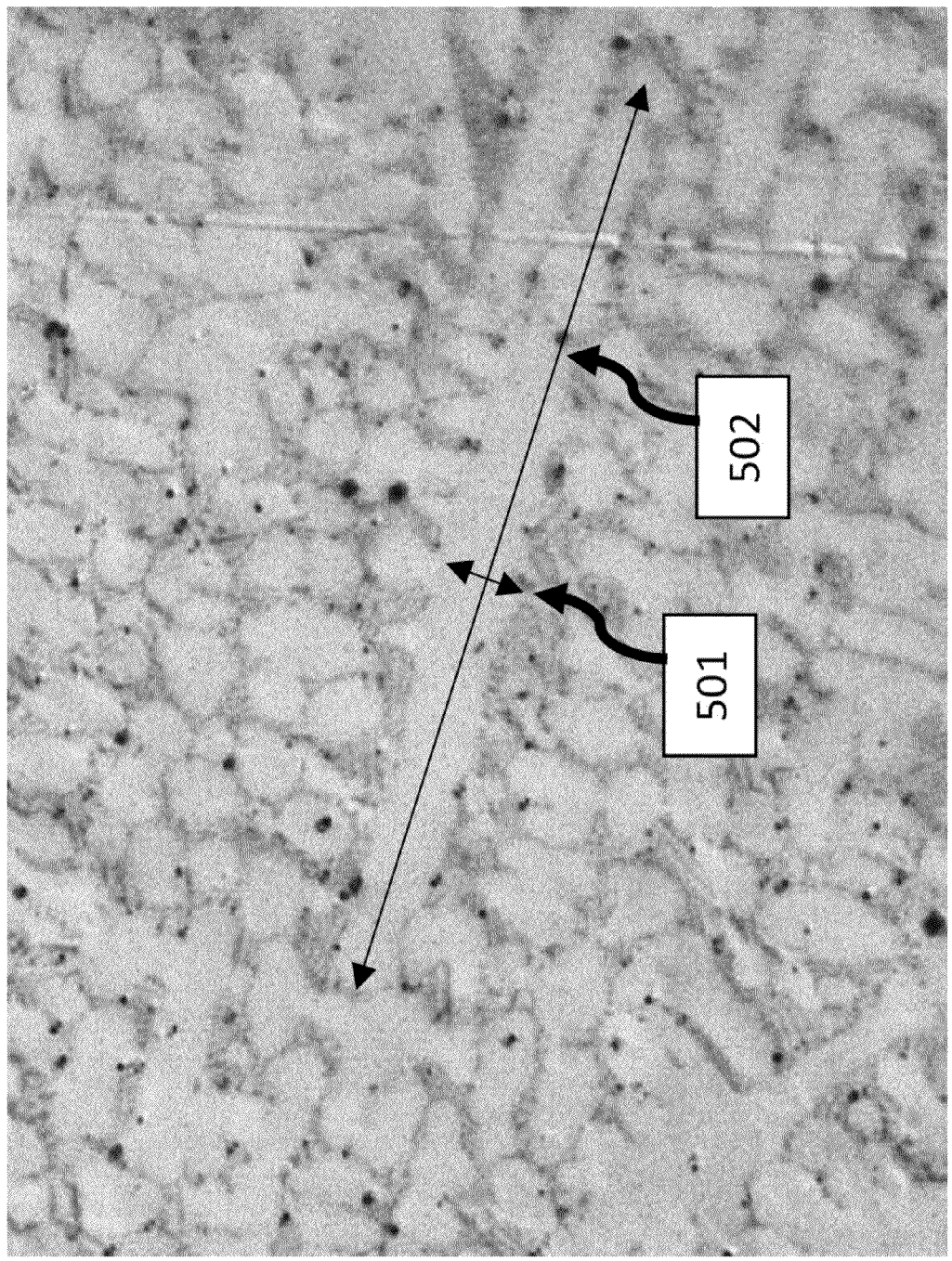
FIG. 6 is a zoom-in of FIG. 5, showing detail of the 63 μm grain.

FIG. 6 is a zoom-in of FIG. 5, showing detail of the 63 μm grain. The minimum dimension of the grain (501) which is 4.5 82 m and the maximum dimension of the grain (502) which is 63 μm. For the purposes of this disclosure the maximum dimension of the grain is the characteristic length of the grain. Grain length is critical to the stress corrosion cracking behavior of the material.

Figure 7A:
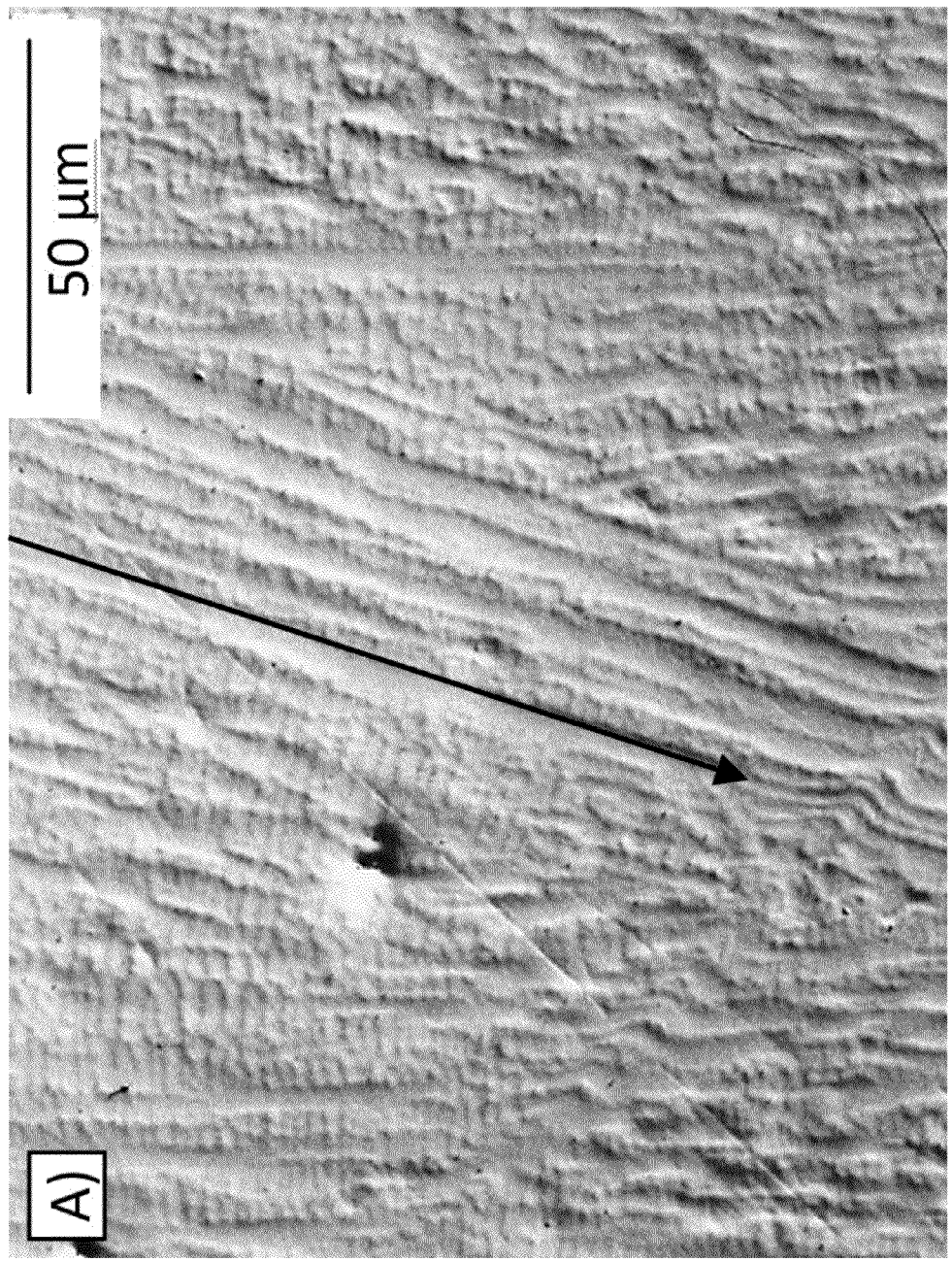
FIGS. 7A and 7B are optical micrographs of Alloy 622 welded with GMAW technique.
Figure 7B:
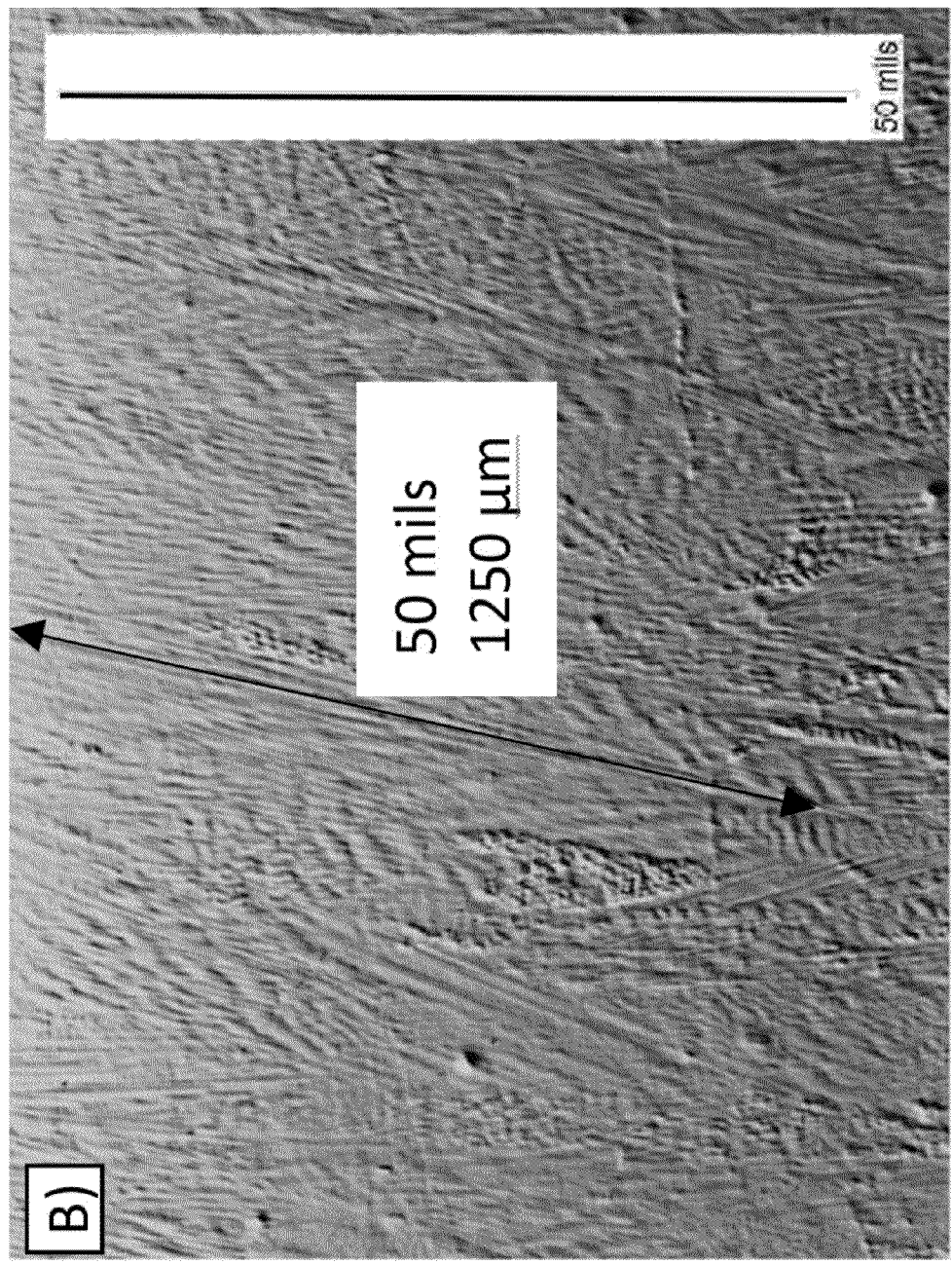

FIGS. 7A and 7B are optical micrographs of Alloy 622 welded with GMAW technique. FIG. 7A is a 500× image showing detailed grains which extend out of field of view and cannot be accurately measured along their maximum level at this magnification. FIG. 7B is a 50× image showing the full length of grains in Alloy 622 at 1250 μm or greater.

Figure 8:
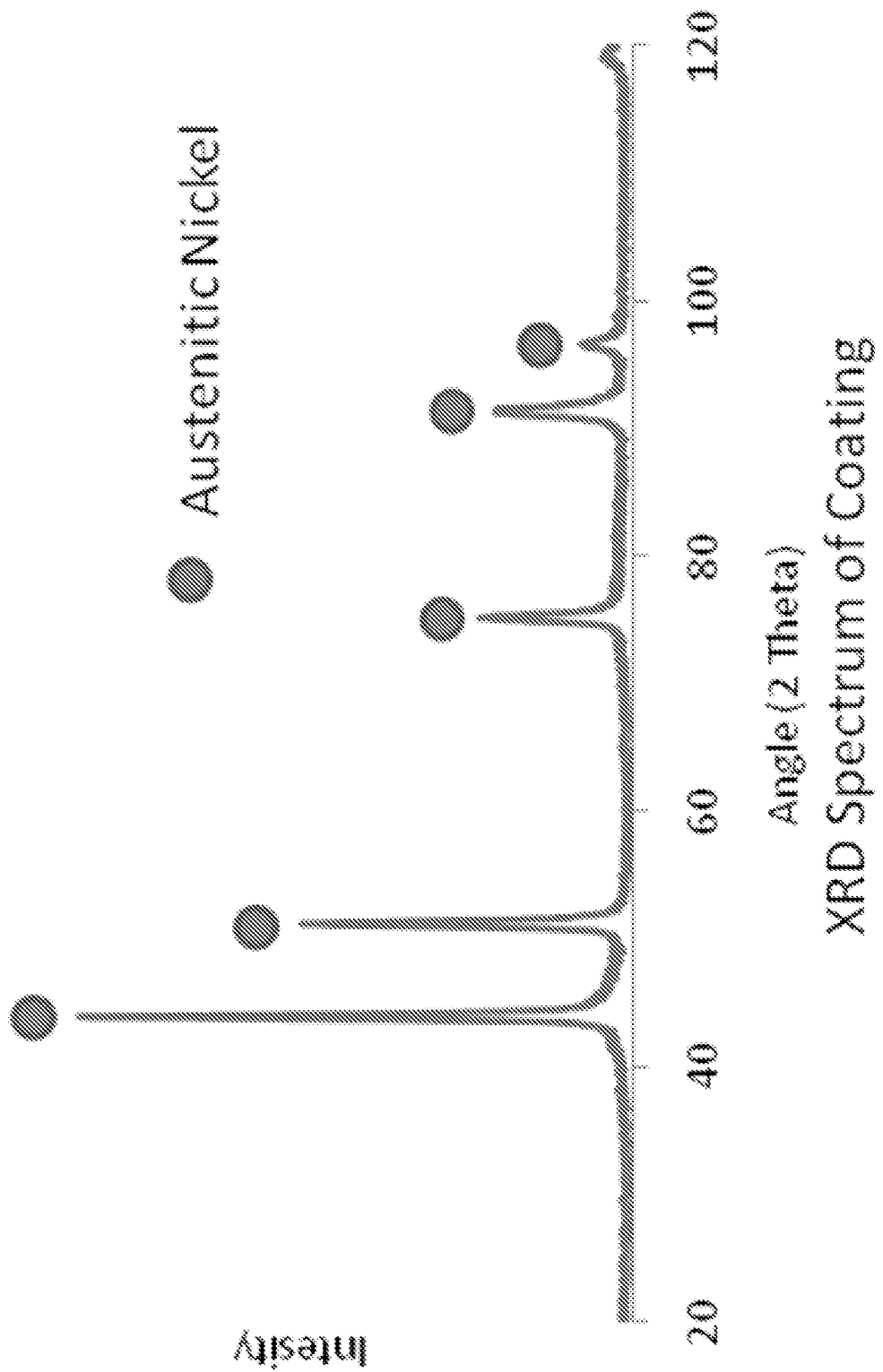
FIG. 8 is an x-ray diffraction spectrum of welded $Ni_{Bal}Cr_{28.86}Mo_{15.17}Fe_{0.14}Si_{1.13}B_{0.47}$ showing a phase structure of entirely austenitic nickel, the desired phase for corrosion performance and thermal expansion compatibility with mild steel.

FIG. 8 is an x-ray diffraction spectrum of welded $Ni_{Bal}Cr_{28.86}Mo_{15.17}Fe_{0.14}Si_{1.13}B_{0.47}$ showing a phase structure of entirely austenitic nickel, the desired phase for corrosion performance and thermal expansion compatibility with mild steel.

Figure 9:
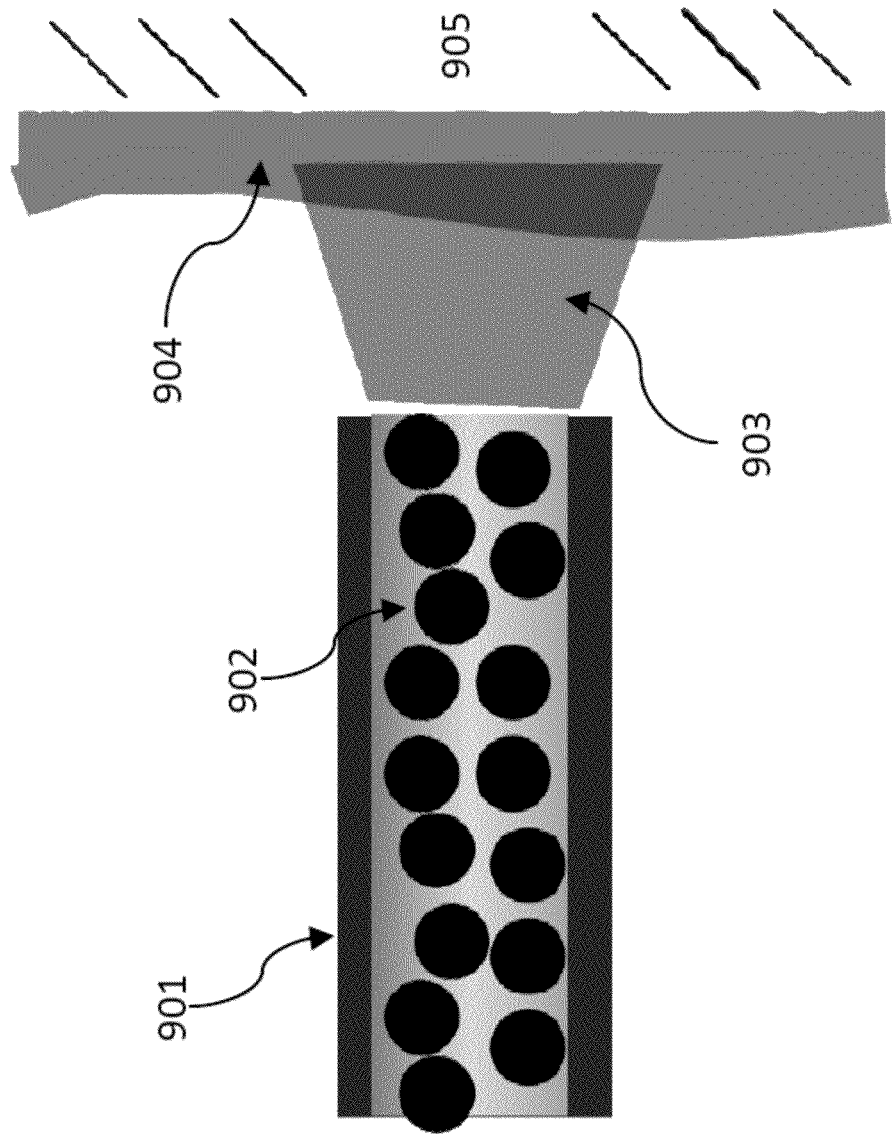
FIG. 9 is a schematic detailing the manufacture and welding process of a cored wire.

FIG. 9 is a schematic depicting the welding process involving a cored wire manufactured using the disclosed techniques. Powder feedstock (902) is inserted into a metallic sheath material (901). During the welding process, the sheath and powder feedstock are melted and alloyed together in the arc (903) and deposited as a weld pool (904) on the substrate (905). In some embodiments, the melting temperature of the sheath material is controlled such that it is below the melting temperature of the weld pool.

TABLE 1

List of alloy compositions

| Alloy | Form | Ni | Cr | Mo | Fe | C | B | Si | Ti | Nb | Sn | alpha | T |
|---|---|---|---|---|---|---|---|---|---|---|---|---|---|
| 1 | Ingot | 53.6 | 26.33 | 11.04 | 0 | 0 | 0 | 4.9 | 0 | 0 | 4.14 | 1.39 | 1361 |
| 2 | Ingot | 45.38 | 26.92 | 12.25 | 0 | 0 | 0 | 3.71 | 0 | 0 | 11.74 | 1.35 | 1361 |
| 3 | Ingot | 44.13 | 23.09 | 16.39 | 0 | 0 | 0 | 2.74 | 1.56 | 12.09 | 0 | 1.39 | 1479 |
| 4 | Ingot | 41.32 | 22.44 | 18.48 | 0 | 0 | 0 | 3.73 | 4.77 | 9.25 | 0 | 1.34 | 1521 |
| 5 | Ingot | 58.58 | 27 | 10.12 | 0 | 0 | 1.2 | 3.11 | 0 | 0 | 0 | 1.31 | 1497 |
| 6 | Ingot | 55.62 | 29.48 | 10.1 | 0 | 0 | 1.63 | 3.17 | 0 | 0 | 0 | 1.27 | 1560 |
| 7 | Ingot | 47.49 | 29.32 | 10.68 | 0 | 0 | 1.15 | 2.98 | 0 | 0 | 8.39 | 1.26 | 1518 |
| 8 | Ingot | 39.39 | 20.58 | 7.7 | 0 | 0 | 0.33 | 0.85 | 0 | 16.83 | 14.33 | 1.30 | 1497 |
| 9 | Ingot | 55.36 | 26.6 | 13.8 | 0 | 0 | 1.18 | 3.06 | 0 | 0 | 0 | 1.29 | 1542 |
| 10 | Ingot | 56.8 | 28.75 | 10.14 | 0 | 0 | 1.2 | 3.11 | 0 | 0 | 0 | 1.32 | 1489 |
| 11 | Ingot | 59.9 | 27.38 | 9.47 | 0 | 0 | 1.19 | 2.05 | 0 | 0 | 0 | 1.37 | 1429 |
| 12 | Ingot | 55.73 | 27.84 | 13.23 | 0 | 0 | 1.17 | 2.03 | 0 | 0 | 0 | 1.36 | 1470 |
| 13 | Ingot | 56.47 | 27.32 | 12.41 | 0 | 0 | 0.78 | 3.03 | 0 | 0 | 0 | 1.38 | 1425 |
| 14 | Ingot | 60.63 | 28.35 | 7.13 | 0 | 0 | 0.79 | 3.09 | 0 | 0 | 0 | 1.40 | 1381 |
| 15 | Ingot | 58.18 | 27.26 | 11.79 | 0 | 0 | 0.77 | 2 | 0 | 0 | 0 | 1.36 | 1442 |
| 16 | Ingot | 59.27 | 26.68 | 12.7 | 0 | 0 | 0.37 | 0.97 | 0 | 0 | 0 | 1.26 | 1551 |
| A | Wire | 57.83 | 27.35 | 10.71 | 0.23 | 0 | 1.17 | 2.71 | 0 | 0 | 0 | N/A | N/A |
| B | Wire | 54.23 | 28.86 | 15.17 | 0.14 | 0 | 0.47 | 1.13 | 0 | 0 | 0 | N/A | N/A |
| C | Wire | 59.2 | 26.7 | 12.7 | 0 | 0 | 0.4 | 1 | 0 | 0 | 0 | N/A | N/A |
| D | Wire | 67.86 | 25.78 | 5.65 | 0 | 0.02 | 0.69 | 0 | 0 | 0 | 0 | N/A | N/A |

Table 1 is a list of alloys compositions in weight percent and corresponding melting temperatures, T (in Kelvin), produced and evaluated as embodiments of the present invention. Alloys 1-16 were produced in ingot form. These alloys were evaluated, and based on those results, the alloys A,B,C, and D were manufactured in the form of welding wire. It should be noted that the compositions of A, B, C, and D could not be made to replicate any of Alloy 1-16 due to manufacturing variations and restrictions. The alloys fall within the compositional range: $Ni_{bal}Cr_{20.5-30}Mo_{5.5-18.5}B_{0-1.75}Si_{0-5}Ti_{0-5}Nb_{0-17}Sn_{0-15}$, measured in weight percent. Some embodiments of the invention may fall within the compositional range: $Ni_{bal}Cr_{25-30}Mo_{5.5-15.5}B_{0.3-1.6}Si_{0-3.5}$, measured in weight percent. Still further embodiments may fall within the compositional range: $Ni_{bal}Cr_{26-29}Mo_{10-15.5}B_{0.4-1.2}Si_{1-3}$, measured in weight percent. As understood in the art, any composition may have certain impurities. Impurities common in embodiments of the invention include Fe, Nb, and C.

One embodiment of the invention comprises a nickel-based alloy possessing phase morphologies on the order of 150 microns or less in the longest dimension when cooled from a liquid state at 5000 K/s or less. In a further embodiment the microstructure is primarily 90% or greater formed of austenitic nickel. In a still further embodiment, the microstructure contains silicide, boride, carbide, aluminide, or nitride precipitates. In one embodiment, the Nickel-based alloy comprises one or a combination of Cr or Mo. In a second embodiment, the alloy further comprises one or a combination of Si or B. In a third embodiment, the alloy comprises one or a combination of N, O, Mg, Ca, Ti, Mn, Fe, Co, Cu, Zn, Nb, Ag, Sn, or W. In a fourth embodiment of the invention, the alloy is given by the formula (in weight percent) $Ni_{100-a-b-c-d}Cr_aMo_bSi_cB_dFe_e$ where a=20 to 32, b=4 to 20, c=0 to 6, d=0 to 6, e=0 to 5.

In a fifth embodiment of the invention, the alloy comprises one or a mixture of the following compositions: $Ni_{Bal}Cr_{27.35}Mo_{10.71}Fe_{0.23}Si_{2.71}B_{1.17}$ (Alloy A); $Ni_{Bal}Cr_{28.86}Mo_{15.17}Fe_{0.14}Si_{1.13}B_{0.47}$ (Alloy B); $Ni_{Bal}Cr_{26.7}Mo_{12.7}Si_{1.0}B_{0.4}$ (Alloy C); $Ni_{Bal}Cr_{25.78}Mo_{5.65}B_{0.69}C_{0.02}$ (Alloy D). In various embodiments, the alloy may be in the form of a welding wire, whether solid, flux-cored, or metal-cored. The alloys may be used as a weld overlay coating for corrosion protection. The alloys may be deposited using welding techniques such as the gas metal arc weld technique or thermal spray techniques such as twin wire arc spray. The alloys may be used to product boiler tubes and related assemblies in power generation plants. In some embodiments, these alloys achieving higher deposition rates via the various welding (gas metal arc weld or other) and thermal spray techniques (twin wire arc spray or other) because of their lower melting temperatures.

Another embodiment of this invention corresponds to the manufacture of cored welding wire to minimized dilution under conditions of high productivity.

FIG. 9 illustrates the manufacture of a cored wire that involves a sheath material 901 which is wrapped into a cylinder and filled with a powder 902, whereas the melting and alloying between both the sheath and powder material in the arc 903 results in the desired alloy. Cored wire is used primarily for its ability to deliver higher current densities and thus higher levels of productivity. Typically, the cored wire is manufactured using common alloys. In the case of Ni—Cr—Mo alloys, pure nickel or nickel-chromium alloy strip is used to form the sheath material 901, and the powder 902 contains an elevated molybdenum content. When the sheath and powder materials are melted and combined 903 in a spray during the welding process, the desired Ni—Cr—Mo alloy content is deposited in the weld bead 904. It is inherent although undesirable in this process for some of the substrate material 905 to dilute the weld bead composition. Accordingly, the weld bead 904 will comprise a weld component having a composition falling with one of the disclosed compositional ranges and a substrate dilution component having a composition similar to that of the substrate material 905.

In further embodiments, the cored wire may comprise a sheath 901 formed of a first alloy falling within one of the compositional ranges disclosed herein and the powder material 902 may comprise powder material components such that the weld bead formed forms a second alloy falling within one of the compositional ranges disclosed herein. For example, a first alloy for the sheath 901 and a second alloy for the weld bead 904 may be selected such that the different in the melting temperatures between the two alloys is at least 50° C., or preferably at least 100° C. For example, alloys 1 or 2 from Table 1 may be used as sheaths for welding wires with appropriate powder cores to form alloys 7 or 8, respectively. Of course, any sheath and final weld composition may be utilized. The upward shift in melting temperature of the weld pool as the powder alloys with the sheath will cause the bead to solidify rapidly effectively lowering the dilution further and allowing for highly controlled welding—for example, in the vertical position. In addition to the processing advantages created by the disclosed manufacturing techniques, this example will also contain the fine-grain structure designed to prevent stress corrosion cracking in the weld In this particular embodiment, the cored wire is manufactured in such a way that the melting temperature of the sheath material is lower (>50° C.) than the melting temperature of the final composition in the weld bead. Design of such an article of manufacture can be achieved with thermodynamic modeling techniques such as those shown in FIG. 1. A cored wire, which has a sheath material of lower melting temperature than the final composition of the weld bead, allows for increased productivity and decreased dilution.

It is well known to those in the field that increased welding power, typically achieved through increasing the amperage, results in higher material deposition rates and a higher level of dilution. Thus, in operations such as boiler cladding where minimizing dilution is a critical concern, productivity must be sacrificed. In a cored wire system the sheath carries the current in the welding process and dictates the current density. Sheath materials of higher melting temperature require more power to melt.

In the disclosed embodiment, a relatively low power level is required to weld the low melting temperature sheath material. During the welding process the powder combines with the molten sheath material forming a molten weld pool of a final desired composition. The alloying of the powder with the molten sheath effectively raises the melting temperature of the final weld bead composition causing the weld pool to solidify rapidly.

The relatively low power input limits the dilution experienced in the welding process because less heat is input into the substrate. Sheath materials with very low melting temperatures allow the productivity to be increased while simultaneously lowering the dilution. The rapid solidification of the weld pool is also advantageous in that it prevents the weld pool from dripping down the substrate surface in vertical welding operations.

Example 1: Manufacture of Wire of Alloy 9, using a sheath material composed of Alloy 11. Alloy 11 has a calculated melting temperature of 1429 K (1155° C.) roughly 200° C. below the melting temperature of Inconel 622 (Tm—1351-1387° C.) and 200° C.-300° C. below the melting temperature of pure Nickel and Ni—Cr alloys Tm=1345-1455° C.). The melting temperature of Inconel 622 is relevant as that is a common feedstock used in solid wire cladding. The melting temperature of pure Nickel and Ni—Cr alloys is relevant in that it is the sheath material used in the manufacture of Ni—Cr—Mo cored wires. Thus, the Alloy 11 sheath requires less heat input during the welding process and will provide the advantage of lower process dilution and higher productivity over the other conventional solutions (solid Inconel 622 wire, cored wire of Ni or Ni—Cr sheath). The powder feedstock in this manufacturing example is a mixture of Ni—Cr, Ni—Mo, Ni—B, Ni—Si, B, and Si powder components such that when alloyed together with the sheath composed of Alloy 11 will form a weld bead with the composition of Alloy 9. The melting temperature of Alloy 9 is 1542 K (1267° C.), roughly 100° C. above the melting temperature of the sheath material. The upward shift in melting temperature of the weld pool as the powder alloys with the sheath will cause the bead to solidify rapidly effectively lowering the dilution further and allowing for highly controlled welding in the vertical position. In addition to the processing advantages created by the disclosed manufacturing techniques, this example will also contain the fine-grain structure designed to prevent stress corrosion cracking in the weld.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A composition of matter, comprising:
   a balance of nickel;
   between approximately 25 and 30 wt. % chromium;
   between approximately 10 and 15.5 wt. % molybdenum;
   between approximately 0.3 and 1.6 wt. % boron; and
   between 0 and approximately 3.5 wt. % silicon;
   the composition not including titanium, niobium, tin, or iron except as an impurity.

2. The composition of claim 1, further comprising:
   a balance of nickel;
   between approximately 26 and 29 wt. % chromium;

between approximately 10 and 15.5 wt. % molybdenum;
between approximately 0.4 and 1.2 wt. % boron; and
between approximately 1 and 3 wt. % silicon.

3. The composition of claim 1, wherein the composition is in the form of an alloy.

4. The composition of claim 1, wherein the composition is a component of a weld bead, the weld bead further comprising a substrate dilution component.

5. The composition of claim 1, wherein the composition is a component of a weld overlay coating, the weld overlay coating further comprising a substrate dilution component.

6. The composition of claim 1, wherein the composition is in the form of a welding wire.

7. The composition of claim 6, wherein the welding wire is a cored welding wire comprising:
    a sheath comprising nickel; and
    a powder material disposed within the sheath; and
    wherein melting of the cored welding wire during welding results in a weld pool having a composition comprising a dilution component and a weld component, the weld component comprising a balance of nickel, between approximately 25 and 30 wt. % chromium, between approximately 10 and 15.5 wt. % molybdenum, between approximately 0.3 and 1.6 wt. % boron, and between 0 and approximately 3.5 wt. % silicon, the composition not including titanium, niobium, tin, or iron except as an impurity.

8. The composition of claim 7, wherein the sheath has a melting temperature that is at least 50° C. less than a melting temperature of a weld bead formed by solidification of the weld pool.

9. The composition of claim 1, wherein the composition is configured such that an alloy formed from the composition possess phase morphologies of approximately 150 microns or less in the longest dimension when cooled from a liquid state at 5,000° K./s or less.

10. A composition of matter, comprising a mixture of one or more of:
    $Ni_{Bal}Cr_{27.35}Mo_{10.71}Fe_{0.23}Si_{2.71}B_{1.17}$;
    $Ni_{Bal}Cr_{28.86}Mo_{15.17}Fe_{0.14}Si_{1.13}B_{0.47}$;
    $Ni_{Bal}Cr_{26.7}Mo_{12.7}Si_{1.0}B_{0.4}$; or
    $Ni_{Bal}Cr_{25.78}Mo_{5.65}B_{0.69}C_{0.02}$.

11. The composition of claim 9, wherein the alloy has a microstructure form of at least 90% austenitic nickel.

12. The composition of claim 11, wherein the microstructure further comprises silicide, boride, carbide, aluminide, or nitride precipitates.

* * * * *